United States Patent
Yamafuji et al.

(10) Patent No.: US 12,399,027 B2
(45) Date of Patent: Aug. 26, 2025

(54) VEHICLE DISPLAY DEVICE, FOR DEPICTING A SCENE AHEAD OF A VEHICLE DISPLAY METHOD, FOR DEPICTING A SCENE AHEAD OF A VEHICLE AND STORAGE MEDIUM STORING A PROGRAM FOR DEPICTING A SCENE AHEAD OF A VEHICLE

(71) Applicant: TOYOTA JIDOSHA KABUSHIKI KAISHA, Toyota (JP)

(72) Inventors: Sara Yamafuji, Toyota (JP); Takahiro Hirota, Aichi-ken (JP); Yuting Zhang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 17/806,129

(22) Filed: Jun. 9, 2022

(65) Prior Publication Data

US 2022/0396149 A1 Dec. 15, 2022

(30) Foreign Application Priority Data

Jun. 10, 2021 (JP) ................. 2021-097508

(51) Int. Cl.
*B60K 35/00* (2024.01)
*G01C 21/36* (2006.01)
(Continued)

(52) U.S. Cl.
CPC .......... *B60K 35/00* (2013.01); *G01C 21/3632* (2013.01); *G01C 21/3638* (2013.01);
(Continued)

(58) Field of Classification Search
CPC ........ B60K 35/00; B60K 35/23; B60K 35/28; B60K 35/60; B60K 35/29; B60K 35/22;
(Continued)

(56) References Cited

U.S. PATENT DOCUMENTS

| 11,650,069 | B2 * | 5/2023 | Lee | G02B 27/0179 |
| | | | | 701/431 |
| 2013/0069941 | A1 * | 3/2013 | Augui | G01C 21/20 |
| | | | | 345/419 |
| 2014/0365935 | A1 * | 12/2014 | Moha | G06F 3/04842 |
| | | | | 715/769 |

(Continued)

FOREIGN PATENT DOCUMENTS

| JP | 2019206262 A | 12/2019 |
| JP | 2020196295 A | 12/2020 |
| JP | 2021076415 A | 5/2021 |
| WO | 2013046425 A1 | 4/2013 |

OTHER PUBLICATIONS

Gradual; May 23, 2020; merriam-webster.com; pp. 1-8.*
Depict, May 23, 2019, collinsdictionary.com, pp. 1-5.*

*Primary Examiner* — Andrew R Dyer
(74) *Attorney, Agent, or Firm* — Dickinson Wright, PLLC

(57) ABSTRACT

A vehicle display device configured to display a predetermined image on a display region depicting a scene ahead of a vehicle. The vehicle display device includes memory and a processor connected to the memory. The processor is configured to acquire position information for the vehicle and position information for a destination point, and to display a first image indicating an orientation of the destination point at the display region in a case in which a relationship between the position of the vehicle and the position of the destination point satisfies a predetermined condition relating to visibility.

9 Claims, 10 Drawing Sheets

(51) Int. Cl.
*B60K 35/23* (2024.01)
*B60K 35/28* (2024.01)
*B60K 35/60* (2024.01)

(52) U.S. Cl.
CPC ............ *G01C 21/365* (2013.01); *B60K 35/23* (2024.01); *B60K 35/28* (2024.01); *B60K 35/60* (2024.01); *B60K 2360/166* (2024.01); *B60K 2360/334* (2024.01); *B60K 2360/785* (2024.01)

(58) Field of Classification Search
CPC ........ B60K 2360/166; B60K 2360/334; B60K 2360/785; B60K 2360/191; G01C 21/3632; G01C 21/3638; G01C 21/365; G01C 21/3626; G01C 21/367; G01C 21/3676; B60R 1/00; B60R 16/02
USPC ......................................................... 701/117
See application file for complete search history.

(56) References Cited

U.S. PATENT DOCUMENTS

| | | | |
|---|---|---|---|
| 2016/0203582 A1* | 7/2016 | Nakai | G06T 3/20 345/682 |
| 2018/0215266 A1* | 8/2018 | Shoji | G06T 5/73 |
| 2018/0239152 A1* | 8/2018 | Kuo | G02B 27/0149 |
| 2019/0075250 A1* | 3/2019 | Asai | H04N 5/2628 |
| 2019/0180485 A1* | 6/2019 | Kim | G06V 20/20 |
| 2019/0347821 A1* | 11/2019 | Stein | G06V 10/772 |
| 2020/0004327 A1* | 1/2020 | Wang | G06F 3/013 |
| 2020/0124849 A1* | 4/2020 | Tsuji | G06F 3/1454 |
| 2021/0223058 A1* | 7/2021 | Horihata | G01C 21/3635 |
| 2021/0248829 A1* | 8/2021 | Steinbrücker | G06T 7/187 |
| 2022/0084458 A1 | 3/2022 | Sakuma et al. | |
| 2023/0045329 A1* | 2/2023 | Saji | B60K 35/53 |
| 2023/0195209 A1* | 6/2023 | Wagner | G06F 3/011 345/419 |

* cited by examiner

VEHICLE DISPLAY DEVICE, FOR DEPICTING A SCENE AHEAD OF A VEHICLE DISPLAY METHOD, FOR DEPICTING A SCENE AHEAD OF A VEHICLE AND STORAGE MEDIUM STORING A PROGRAM FOR DEPICTING A SCENE AHEAD OF A VEHICLE

CROSS-REFERENCE TO RELATED APPLICATION

This application is based on and claims priority under 35 USC 119 from Japanese Patent Application No. 2021-097508 filed on Jun. 10, 2021, the disclosure of which is incorporated by reference herein.

BACKGROUND

Technical Field

The present disclosure relates to a vehicle display device, a display method, and a storage medium.

Related Art

International Publication (WO) No. 2013/046425 discloses a vehicle display device (head-up display device) in which an image is projected onto a combiner disposed between an occupant inside a vehicle cabin and a front window so as to display the orientation of the vehicle destination. In this vehicle display device, an image of a direction information display ring is projected onto the combiner so as to be superimposed on a scene ahead as viewed by the occupant through the front window. The orientation of the destination with respect to the vehicle is displayed using the position of a destination icon that moves over the direction information display ring.

However, if an icon indicating the orientation of the destination is always displayed at the center of a display region as in the technology disclosed in WO No. 2013/046425, this might annoy the occupant, depending on a positional relationship of the destination with respect to the vehicle.

For example, when the vehicle is traveling in the vicinity of its destination and the occupant is viewing the display region to check the destination in the scene ahead, the visibility of the scene ahead might be impaired by the icon indicating the orientation of the destination, which could annoy the occupant.

SUMMARY

In consideration of the above circumstances, an object of the present disclosure is to provide a vehicle display device, a display method, and a storage medium that are capable of displaying information relating to a destination point in consideration of a positional relationship between a vehicle and the destination point.

A vehicle display device according to a first aspect of the present disclosure is a vehicle display device configured to display a predetermined image on a display region depicting a scene ahead of a vehicle. The vehicle display device includes a position information acquisition section configured to acquire position information for the vehicle and position information for a destination point, and a display section configured to display a first image indicating an orientation of the destination point at the display region in a case in which a relationship between the position of the vehicle and the position of the destination point satisfies a predetermined condition relating to visibility.

In the first aspect, the vehicle display device displays a predetermined image in the display region depicting the scene ahead of the vehicle. The vehicle display device acquires the position information for the vehicle and the position information for the destination point, and displays the first image indicating the orientation of the destination point in the display region in a case in which the relationship between the position of the vehicle and the position of the destination point satisfies the visibility-related predetermined condition. This enables the orientation of the destination point to be conveyed to an occupant in consideration of the positional relationship between the vehicle and the destination point.

A vehicle display device according to a second aspect of the present disclosure has the configuration of the first aspect, wherein the predetermined condition is a condition that a distance from the vehicle to the destination point is equal to or greater than a first threshold value.

In the second aspect, the first image indicating the orientation of the destination point is displayed in the display region in a case in which the distance from the vehicle to the destination point is equal to or greater than the first threshold value. This enables the orientation of the destination point to be displayed in a case in which the distance from the vehicle to the destination point is far enough that it would be difficult to see the destination point through the display region. Thus, the destination point included in the scene ahead of the vehicle and the first image do not coexist in the display region, such that this destination point-related information can displayed without annoying the occupant.

A vehicle display device according to a third aspect of the present disclosure has the configuration of the first aspect, wherein the predetermined condition is a condition that the position of the destination point is a position that is not included in the scene ahead in the display region.

In the third aspect, the first image indicating the orientation of the destination point is displayed in the display region in a case in which the position of the destination point is a position that is not included in the scene ahead in the display region. This enables the orientation of the destination point to be displayed in a case in which buildings in the surrounding area block the view and the destination point is not visible through the display region. Thus, the destination point included in the scene ahead of the vehicle and the first image do not coexist in the display region, such that the destination point-related information can displayed without annoying the occupant.

A vehicle display device according to a fourth aspect of the present disclosure has the configuration of any one of the first aspect to the third aspect, wherein, in a case in which the predetermined condition is not satisfied, the display section is configured to display a second image indicating the destination point at a position corresponding to the destination point in the scene ahead of the vehicle shown in the display region.

In the fourth aspect, the second image indicating the destination point is displayed at a position corresponding to the destination point in the scene ahead of the vehicle in a case in which the positional relationship between the vehicle and the destination point does not satisfy the predetermined condition. This enables the position of the destination point to be conveyed to the occupant in consideration of the positional relationship between the vehicle and the destination point.

A vehicle display device according to a fifth aspect of the present disclosure has the configuration of the fourth aspect, wherein the display section is configured to display the second image in the display region such that the second image gradually comes into focus from an out-of-focus state as a distance from the vehicle to the destination point decreases.

In the fifth aspect, the second image displayed in the display region is displayed so as to gradually come into focus from its out-of-focus state as the distance from the vehicle to the destination point decreases. Thus, the second image is displayed with a blurred outline in for example cases in which the destination point is far from the vehicle and the destination point is an extremely small presence in the scene ahead, thereby indicating the region where the destination point is present to the occupant. The display form of the second image is then altered so as to gradually come into focus as the distance from the vehicle to the destination point decreases, such that the outline of the second image gradually becomes clearer and is altered to a form in which the position of the destination point is clearly indicated. Displaying the second image in a form in which the destination point gradually becomes clearer and more recognizable from a position before the destination point in this manner enables the occupant to perceive the degree of progress toward the destination point without feeling any annoyance.

A vehicle display device according to a sixth aspect of the present disclosure has the configuration of the fourth aspect when dependent from the second aspect, wherein, in a case in which the distance from the vehicle to the destination point is less than the first threshold value and is no less than a second threshold value that is lower than the first threshold value, the display section is configured to display the second image in the display region such that the second image gradually becomes smaller in size as the distance from the vehicle to the destination point decreases.

In the sixth aspect, the second image displayed in the display region is displayed so as to gradually become smaller as the distance from the vehicle to the destination point decreases in a case in which the distance from the vehicle to the destination point is less than the first threshold value and is no less than the second threshold value that is lower than the first threshold value. Namely, the destination point is an extremely small presence in the scene ahead in for example cases in which the distance from the vehicle to the destination point is comparatively far, and so intentionally enlarging the display of the second image enables the occupant to perceive the region where the destination point is present while keeping their attention on the scene ahead. By then gradually making the second image smaller as the vehicle approaches the destination point, the form of display is altered such that the region where the destination point is present is reduced in size, such the occupant naturally shifts their attention toward the destination point in the scene ahead. In this manner, the occupant's perception of the destination point can be made to naturally shift from the second image to the destination point in the scene ahead as the vehicle approaches the destination point.

A vehicle display device according to a seventh aspect of the present disclosure has the configuration of the sixth aspect, wherein, in a case in which the distance from the vehicle to the destination point is less than the second threshold value, the display section is configured to display the second image in the display region such that the second image gradually becomes larger in size as the distance from the vehicle to the destination point decreases.

In the seventh aspect, the second image displayed in the display region is displayed so as to gradually become larger as the distance from the vehicle to the destination point decreases in a case in which the distance from the vehicle to the destination point is less than the second threshold value. Thus, for example, at a distance where the destination point is visible through the display region, the display of the second image is enlarged as the destination point gradually draws nearer. This enables a visual effect in which the second image draws nearer the vehicle as an integral unit with the destination point to be imparted to the occupant. This enables the occupant to intuitively perceive the degree of progress toward the destination point.

A vehicle display device according to an eighth aspect of the present disclosure has the configuration of any one of the fourth aspect to the seventh aspect, wherein the display region is configured by a projection surface provided at a vehicle front side of a driving seat and projected onto by a head-up display device. The display section is configured to display the second image at a position corresponding to the destination point in the scene ahead of the vehicle as seen through the display region.

In the eighth aspect, the display region depicting the scene ahead of the vehicle is configured by the projection surface provided at the vehicle front side of the driving seat and projected onto by the head-up display device. The second image indicating the destination point of the vehicle is displayed at a position corresponding to the destination point in the scene ahead of the vehicle as viewed through the display region. Thus, the vehicle display device displays the second image so as to be superimposed on the scene ahead as viewed from the driving seat, thereby enabling an occupant of the driving seat to perceive the destination point without having to greatly shift their gaze.

A display method according to a ninth aspect of the present disclosure is a display method for displaying a predetermined image at a display region depicting a scene ahead of a vehicle. The display method includes acquiring position information for the vehicle and position information for a destination point, and displaying a first image indicating an orientation of the destination point at the display region in a case in which a relationship between the position of the vehicle and the position of the destination point satisfies a predetermined condition relating to visibility.

As described above, the display method according to the ninth aspect enables the destination point-related information to be displayed in consideration of the positional relationship between the vehicle and the destination point.

A program according to a tenth aspect of the present disclosure is a program for displaying a predetermined image at a display region depicting a scene ahead of a vehicle. The program being executable by a computer to perform processing including acquiring position information for the vehicle and position information for a destination point, and displaying a first image indicating an orientation of the destination point at the display region in a case in which a relationship between the position of the vehicle and the position of the destination point satisfies a predetermined condition relating to visibility.

As described above, the program according to the tenth aspect enables destination point-related information to be displayed in consideration of the positional relationship between the vehicle and the destination point.

The present disclosure enables destination point-related information to be displayed in consideration of the positional relationship between the vehicle and the destination point.

BRIEF DESCRIPTION OF THE DRAWINGS

Exemplary embodiments of the present invention will be described in detail based on the following figures, wherein.

DETAILED DESCRIPTION

Figure 1:
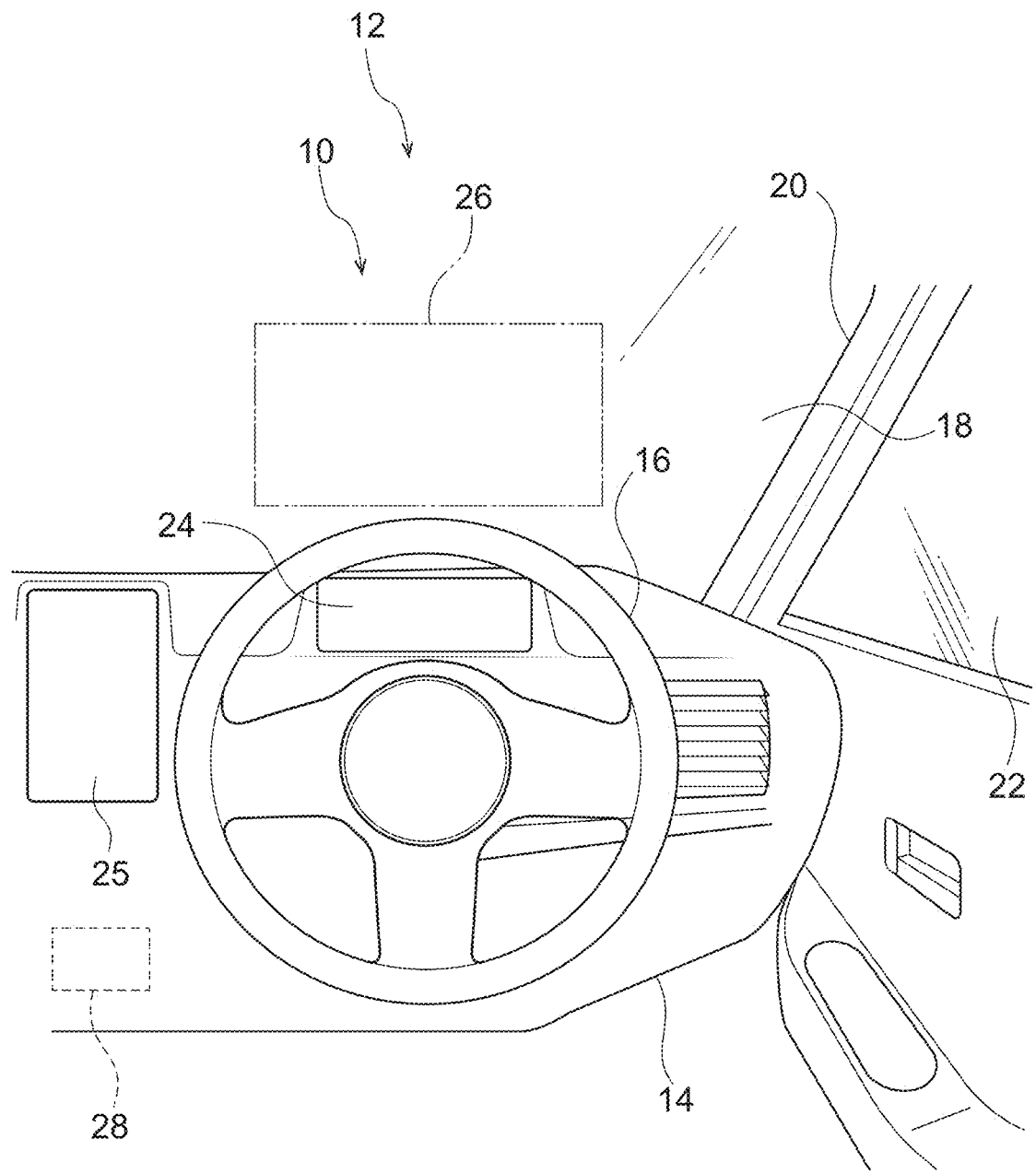
FIG. 1 is a schematic view illustrating a front section inside a vehicle cabin of a vehicle applied with a vehicle display device according to an exemplary embodiment, as viewed from a vehicle rear side.

Explanation follows regarding a vehicle 12 applied with a vehicle display device 10 according to an exemplary embodiment, with reference to the drawings. Note that the vehicle 12 of the present exemplary embodiment is as an example configured so as to be capable of switching between autonomous driving and manual driving. Note that autonomous driving is a form of vehicle travel in which operation of some or all out of an accelerator pedal, brakes, indicators, steering, and so on is autonomous. Manual driving is a form of vehicle travel in which a driver executes all the driving operations (operation of the accelerator pedal, brakes, indicators, steering, and so on). As illustrated in FIG. 1, an instrument panel 14 is provided at a front section inside a vehicle cabin of the vehicle 12.

The instrument panel 14 extends along a vehicle width direction. A steering wheel 16 is provided on a vehicle right side of the instrument panel 14. Namely, in the present exemplary embodiment as an example, the vehicle is a right-hand drive vehicle in which the steering wheel 16 is provided on the right side and a driving seat is set on the vehicle right side.

Windshield glass 18 is provided at a front end portion of the instrument panel 14. The windshield glass 18 is disposed at a vehicle front side of the driving seat, and extends along a vehicle vertical direction and the vehicle width direction so as to partition between the vehicle cabin interior and the vehicle cabin exterior.

A vehicle right end portion of the windshield glass 18 is fixed to a front pillar 20 on the vehicle right side. The front pillar 20 extends along the vehicle vertical direction, and the windshield glass 18 is fixed to a vehicle width direction inner end portion of the front pillar 20. A front end portion of front side glass 22 is fixed to a vehicle width direction outer end portion of the front pillar 20. Note that a vehicle left end portion of the windshield glass 18 is fixed to a non-illustrated front pillar on a vehicle left side.

A first display section 24 including a display region for a predetermined image is provided to the instrument panel 14. The first display section 24 is configured by a meter display provided at a vehicle width direction right-side portion of the instrument panel 14 so as to be located at the vehicle front side of the driving seat. The meter display configures part of a non-illustrated meter display device connected to various meter equipment installed to the vehicle 12. The first display section 24 is provided at a position that falls within the field of view of the driver in a state in which the driver is directing their gaze toward the vehicle front.

A second display section 25 including a display region for a predetermined image is provided to the instrument panel 14. The second display section 25 is configured by a display provided at a vehicle width direction central portion of the instrument panel 14 so as to be located at the vehicle front side of the driving seat.

A third display section 26 including a display region for a predetermined image is provided to the windshield glass 18. The third display section 26 is set at a vehicle upper side of the first display section 24, and is configured by a projection surface projected onto by a head-up display device 44 (see FIG. 2). Specifically, the head-up display device 44 is provided further toward the vehicle front side than the instrument panel 14, and a picture from the head-up display device 44 is projected onto the third display section 26 of the windshield glass 18. Namely, the third display section 26 is configured by the windshield glass 18 serving as the projection surface of the head-up display device 44.

Hardware Configuration of Vehicle Display Device 10

Figure 2:
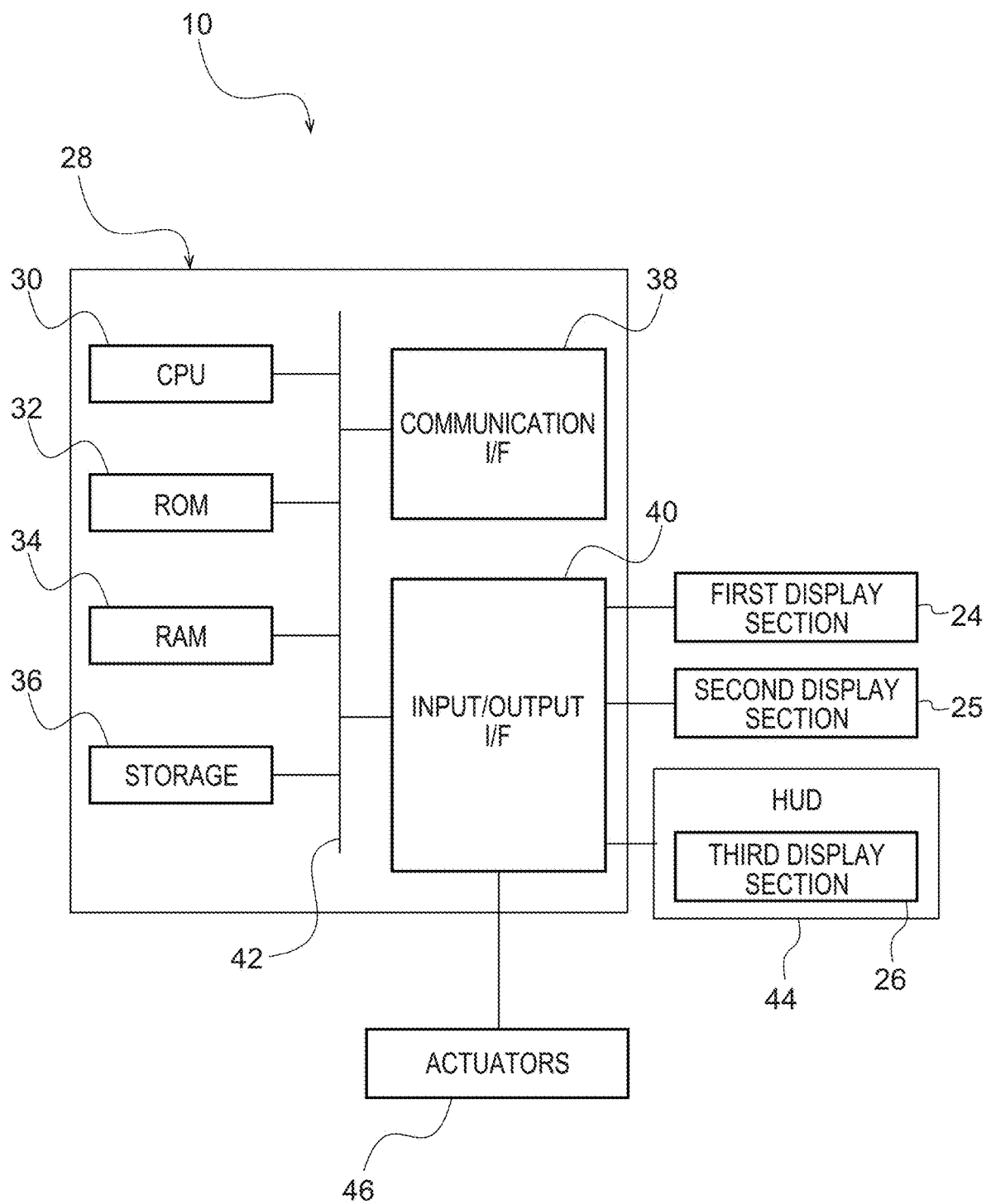
FIG. 2 is a block diagram illustrating a hardware configuration of a vehicle display device according to an exemplary embodiment.

An electronic control unit (ECU) 28, serving as a control section, is provided to the vehicle 12. FIG. 2 is a block diagram illustrating a hardware configuration of the vehicle display device 10. As illustrated in FIG. 2, the ECU 28 of the vehicle display device 10 is configured including a central processing unit (CPU: processor) 30, read only memory (ROM) 32, random access memory (RAM) 34, storage 36, a communication interface 38, and an input/output interface 40. The respective configuration is connected so as to be capable of communicating with each other through a bus 42. The CPU 30 is an example of a processor, and the RAM 34 is an example of memory.

The CPU 30 is a central processing unit that executes various programs and controls various sections. Namely, the CPU 30 reads a program from the ROM 32 or the storage 36, and executes the program using the RAM 34 as a workspace. The CPU 30 controls the respective configuration and performs various computation processing based on the program recorded in the ROM 32 or the storage 36.

The ROM 32 holds various programs and various data. The RAM 34 acts as a workspace to temporarily store programs and data. The storage 36 is configured by a hard disk drive (HDD) or a solid state drive (SSD), and holds various programs including an operating system, as well as various data. In the present exemplary embodiment, a program, various data, and the like for performing display processing are held in the ROM 32 or the storage 36.

The communication interface 38 is an interface enabling the vehicle display device 10 to communicate with a non-illustrated server and other equipment, and employs a protocol such as Ethernet (registered trademark), LTE, FDDI, or Wi-Fi (registered trademark).

The first display section 24, the second display section 25, the head-up display device 44 that projects a predetermined image onto the third display section 26, and actuators 46 are connected to the input/output interface 40. The actuators 46 are configured including a steering actuator, an accelerator actuator, and a brake actuator. The steering actuator performs steering of the vehicle 12. The accelerator actuator performs acceleration of the vehicle 12. The brake actuator controls the brakes to perform deceleration of the vehicle 12. Note that a non-illustrated camera for imaging the surroundings of the vehicle 12, as well as various sensors, a GPS device, and the like employed during autonomous travel of the vehicle 12, are also connected to the input/output interface 40.

Functional Configuration of Vehicle Display Device 10

The vehicle display device 10 implements various functions using the above-described hardware resources. Explanation follows regarding functional configuration implemented by the vehicle display device 10, with reference to FIG. 3.

Figure 3:
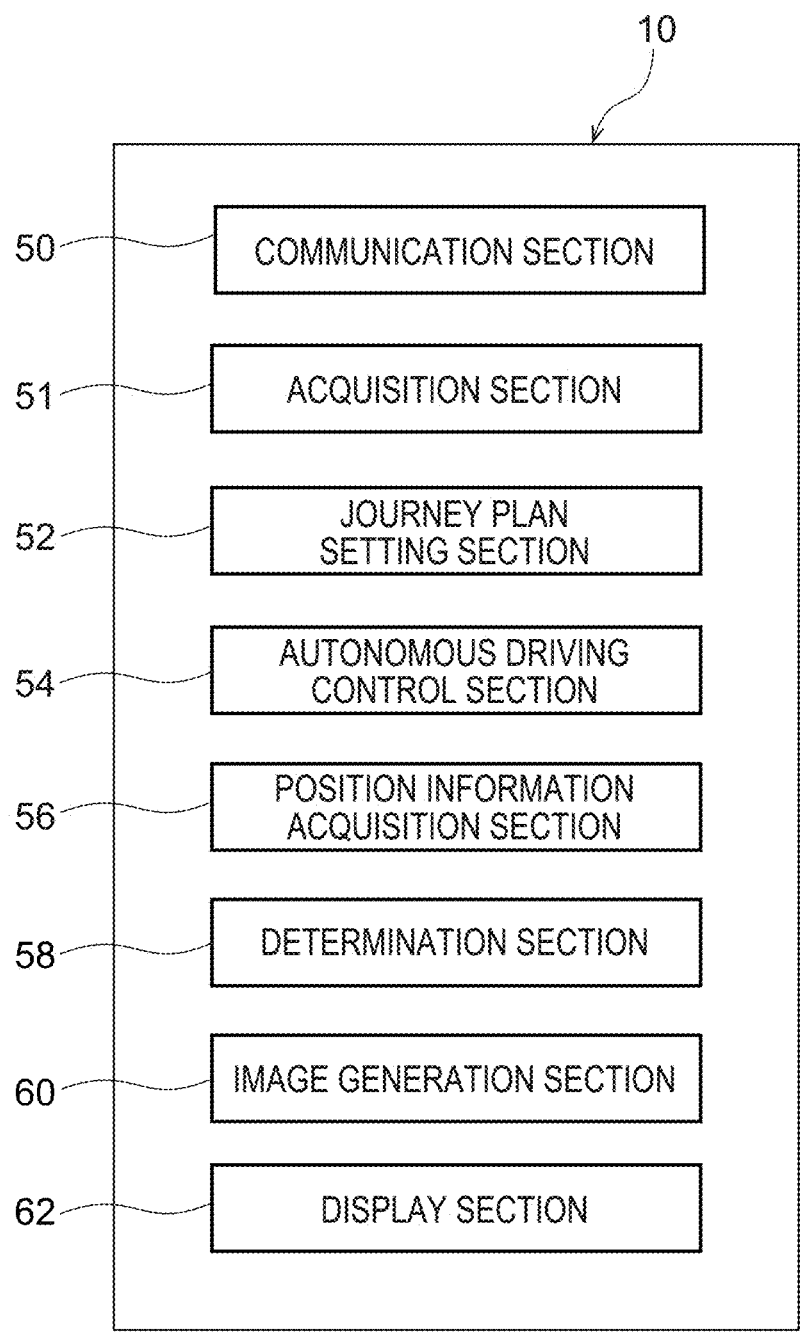
FIG. 3 is a block diagram illustrating a functional configuration of a vehicle display device according to an exemplary embodiment.

As illustrated in FIG. 3, the vehicle display device 10 is configured including a communication section 50, an acquisition section 51, a journey plan setting section 52, an autonomous driving control section 54, a position information acquisition section 56, a determination section 58, an image generation section 60, and a display section 62 as functional configuration. The respective functional configuration is implemented by the CPU 30 reading and executing the corresponding program stored in the ROM 32 or the storage 36.

The communication section 50 exchanges data with an external server and other equipment through the communication interface 38. Examples of the data exchanged include map data and traffic conditions that are held on the server. The communication section 50 may be configured to perform vehicle-to-vehicle communication with vehicles in the surrounding area.

The acquisition section 51 acquires as surroundings information a travel environment of the vehicle 12 from a non-illustrated external sensor through the input/output interface 40. The external sensor is configured including at least one out of a camera that images a predetermined range in the surroundings of the vehicle 12, millimeter-wave radar that transmits waves to search over a predetermined range, or light detection and ranging/laser imaging detection and ranging (LIDAR) that scans over a predetermined range. As an example, the "surroundings information" includes information relating to the road profile and width of the lane of travel of the vehicle 12, other vehicles traveling in the vicinity of the vehicle 12, obstacles, and so on, as well as environmental information such the weather and brightness of the vehicle surroundings.

The journey plan setting section 52 sets a journey plan for the vehicle 12. Specifically, when an occupant inputs a destination point, a journey plan is set from the current location to the destination point.

The autonomous driving control section 54 controls switching between manual driving and autonomous driving of the vehicle 12. Moreover, in a case in which a driving mode of the vehicle 12 has been switched to autonomous driving, the autonomous driving control section 54 causes the vehicle 12 to drive autonomously according to the set journey plan while taking the position information and environmental information regarding the surrounding area of the vehicle 12 into consideration. Specifically, the vehicle 12 is made to travel autonomously by controlling the actuators 46.

The position information acquisition section 56 acquires position information for the vehicle 12 and position information for the destination point set in the journey plan. Specifically, for example, the position information for the vehicle 12 is acquired using the GPS device. The position information for the destination point of the vehicle 12 and map information for the surroundings of the destination point is acquired by referencing the map data.

The determination section 58 includes a function to determine whether or not a relationship between the position of the vehicle and the position of the destination point satisfies a predetermined condition relating to visibility based on the position information acquired by the position information acquisition section 56. For example, the predetermined condition may be a condition to determine whether it would be difficult for an occupant to see the destination point through the third display section 26 (windshield glass 18) in consideration of the distance from the vehicle 12 to the destination point, or the surrounding environment of the destination point.

Figure 5:
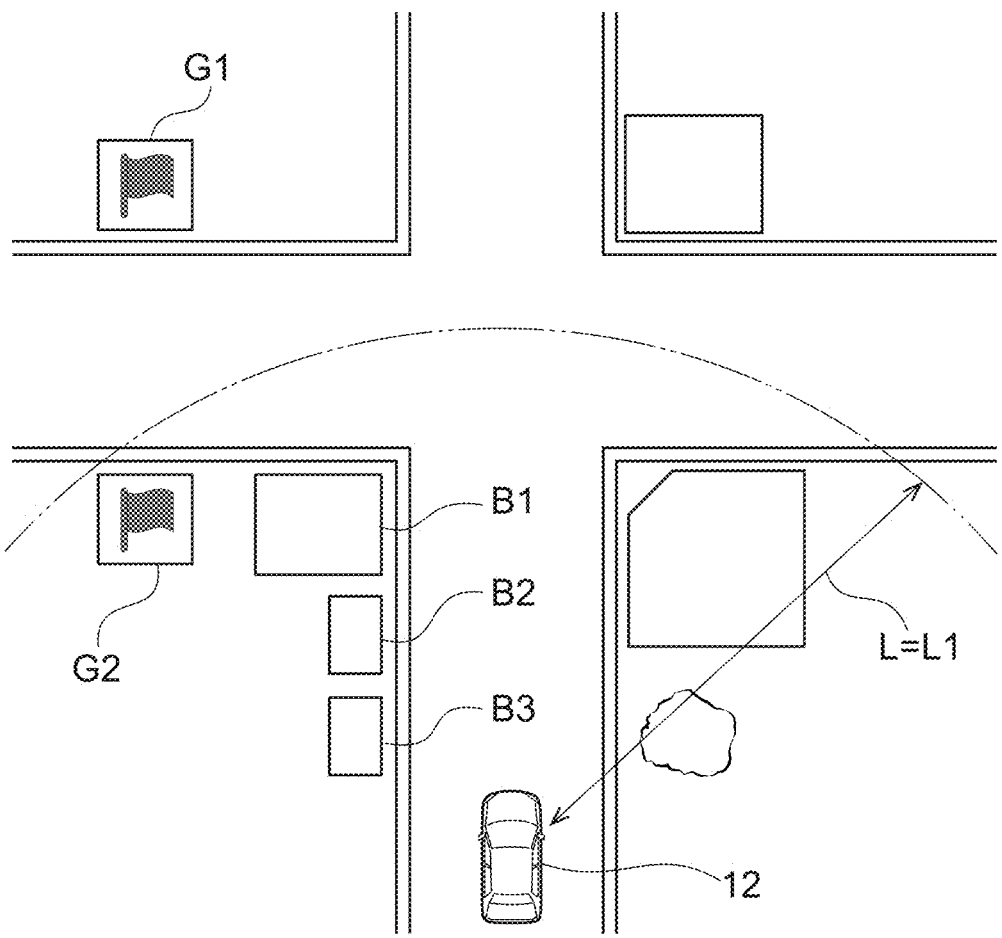
FIG. 5 is a diagram illustrating an example of positional relationships between a vehicle and destination points.

In the present exemplary embodiment, the determination section 58 determines whether or not a distance L from the vehicle 12 to the destination point is a distance L1 (such as L1=200 m) or greater. Namely, in a case in which the distance from the vehicle to the destination point is the distance L1 or greater, a determination is made that it would be difficult for the occupant to see the destination point through the third display section 26, and so a determination is made that the condition is satisfied. In FIG. 5 as an example, a destination point that is further away from the vehicle 12 than the distance L1 is indicated by the reference numerals "G1".

In the present exemplary embodiment, the determination section 58 also determines whether or not the position of the destination point is at a position that is visible through the third display section 26 in consideration of the surrounding environment of the destination point. Namely, even if the distance L from the vehicle 12 to the destination point is less than L1, in a case in which buildings or the like in the surroundings block the view such that the destination point cannot be spotted from the vehicle 12, a determination is made that it would be difficult for the occupant to see the destination point through the third display section 26, and so a determination is made that the condition is satisfied. In FIG. 5 as an example, a destination point that is blocked from view by buildings B1 to B3 in the surroundings and cannot be spotted from the vehicle 12 is indicated by the reference numerals "G2".

The image generation section 60 generates an image for display on the third display section 26, this being the projection surface of the head-up display device 44. Images generated by the image generation section 60 include for example a non-illustrated meter display indicating a travel speed of the vehicle 12, and various images to support manual driving or autonomous driving.

In the present exemplary embodiment, the image generation section 60 generates a first image 70 indicating the orientation of the destination point with the vehicle 12 as a reference in a case in which the determination section 58 has determined that the condition is satisfied in particular. The image generation section 60 generates a second image 80 indicating the destination point in a case in which the determination section 58 has determined that the condition is not satisfied.

The display section 62 displays the image generated by the image generation section 60 in the display region of the third display section 26. The display section 62 displays the first image 70 on the third display section 26 in a case in which the determination section 58 determines that the condition is satisfied. The display section 62 deletes the first image 70 from the third display section 26 and displays the second image 80 instead in a case in which the determination section 58 determines that the condition is not satisfied. The display section 62 then deletes the second image 80 from the third display section 26 when the vehicle 12 has reached its destination point.

The display section 62 of the present exemplary embodiment displays the first image 70 or second image 80 in the display region of the third display section 26 such that this image is a fusion with the scene ahead of the vehicle 12 as viewed through the third display section 26 (windshield glass 18).

Figure 6:
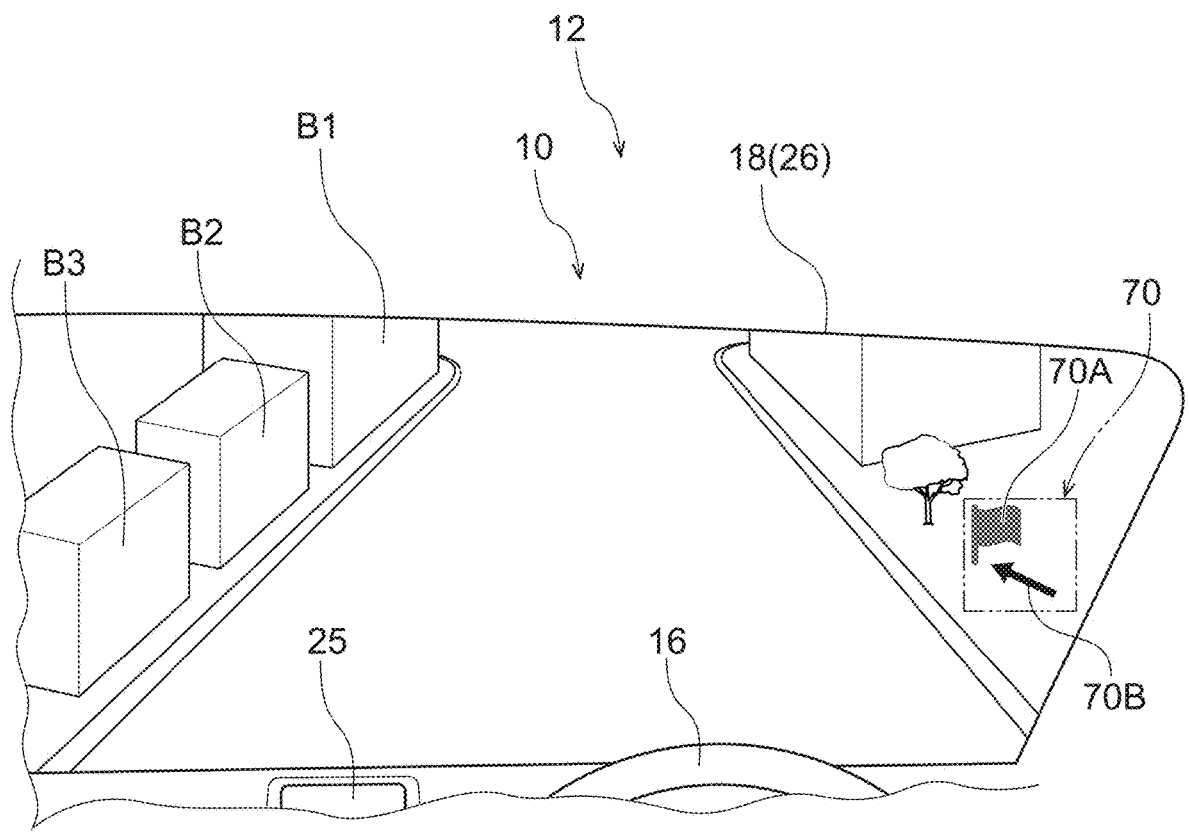
FIG. 6 is a diagram illustrating an example of a display method of a first image in a case in which a distance from a vehicle to a destination point is a distance L1 or greater.
Figure 7:
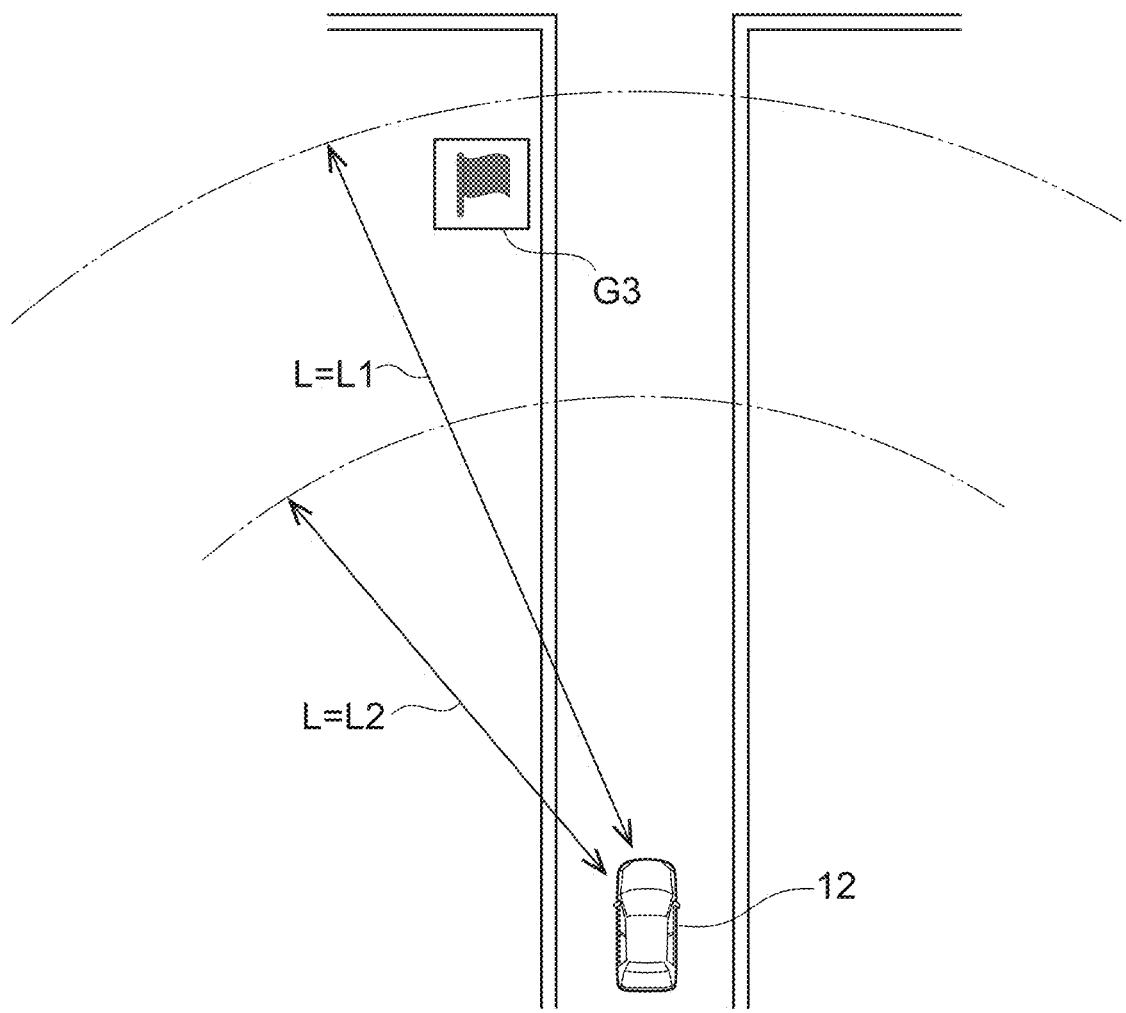
FIG. 7 is a diagram illustrating an example of a positional relationship between a vehicle and a destination point.

As illustrated in FIG. 6 as an example, the first image 70 is displayed at one end of the display region of the third display section 26 in consideration of enabling the occupant of the driving seat to see ahead. The first image 70 includes a destination icon 70A in the form of a flag representing the destination point, and an orientation icon 70B in the form of an arrow pointing at the destination icon 70A. The orientation icon 70B is pointing at the orientation of the destination icon 70A disposed at the oblique front-left thereof, and so it can be understood from FIG. 6 that the destination point is present at an orientation toward the oblique front-left with respect to the vehicle 12.

As illustrated in FIG. 8A to FIG. 8C and FIG. 9A to FIG. 9C as an example, the second image 80 is displayed at a position corresponding to the destination point in the scene ahead as seen by the driving seat occupant through the third display section 26. Thus, the second image 80 is displayed so as to appear superimposed on the destination point visible through the windshield glass 18 from the perspective of the driving seat occupant. As an example, the second image 80 is configured by an image in the form of a flag. The second image 80 is displayed in a form in which the focus and size of the image differs according to the distance L from the vehicle 12 to the destination point. The display method of the second image 80 is described in detail later.

Operation

Next, explanation follows regarding operation of the present exemplary embodiment.

Display Processing

Figure 4:
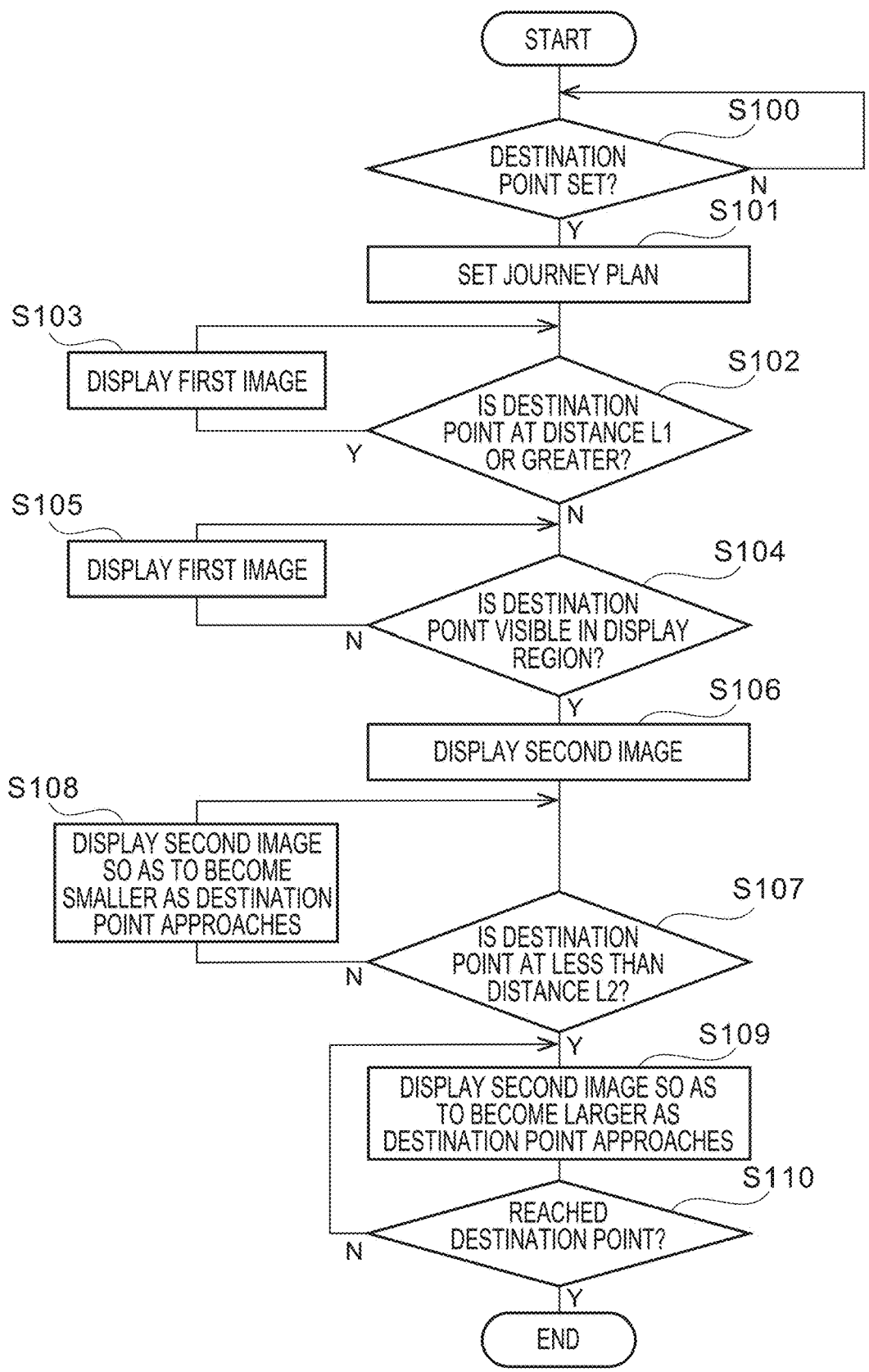
FIG. 4 is a flowchart illustrating an example of a flow of display processing of an exemplary embodiment.

Explanation follows regarding an example of the display processing to display the first image 70 or second image 80 based on the position of the vehicle 12 and the position of the destination point, with reference to the flowchart illustrated in FIG. 4. The display processing is executed by the CPU 30 reading a display program from the ROM 32 or the storage 36 and expanding and executing the display program in the RAM 34.

As illustrated in FIG. 4, at step S100, the CPU 30 determines whether or not a destination point has been set. An occupant may input the destination point directly to the vehicle 12, or may input the destination point indirectly using a mobile terminal or the like.

In a case in which the CPU 30 determines that the destination point has been set at step S100, processing transitions to step S101. In a case in which the CPU 30 determines that the destination point has not been set at step S100, the processing of step S100 is repeated.

At step S101, the CPU 30 sets a journey plan for the vehicle 12. Specifically, the CPU 30 uses the functionality of the journey plan setting section 52 to set a journey plan from the current location to the destination point. Information relating to traffic conditions, accidents, and the like may be acquired and reflected when setting the journey plan. Moreover, the journey plan may be set so as to include a large degree of autonomous driving according to occupant preferences input in advance.

At step S102, the CPU 30 uses the functionality of the determination section 58 to determine whether or not the distance L from the vehicle 12 to the destination point is the distance L1 or greater. As an example, the distance L1 is set to 200 m, and so the CPU 30 determines at step S102 whether or not the distance L from the vehicle 12 to the destination point is 200 m or greater. In a case in which the distance L to the destination point is 200 m or greater, the CPU 30 transitions to the processing of step S103. In a case in which the distance L to the destination point is less than 200 m, the CPU 30 transitions to the processing of step S104. Note that the distance L1 corresponds to a "first threshold value" of the present disclosure.

At step S103, the CPU 30 displays the first image 70 indicating the orientation of the destination point on the third display section 26. For example, if the destination point G1 in FIG. 5 is set as the destination point of the vehicle 12, since the destination point G1 is more than 200 m away from the vehicle 12, the CPU 30 generates and displays the first image 70 indicating the orientation of the destination point G1. As illustrated in FIG. 6, the first image 70 is configured by the flag-shaped destination icon 70A and the arrow-shaped orientation icon 70B pointing at the destination icon 70A, and is displayed at one end of the third display section 26. It can be understood from the orientation icon 70B pointing toward the oblique front-left in FIG. 6 that the destination point G1 is present at an orientation toward the oblique front-left of the vehicle 12. After having displayed the first image 70 at step S103, the CPU 30 returns to step S102 and repeats the processing from there onward.

At step S104, the CPU 30 uses the functionality of the determination section 58 to determine whether or not the destination point is depicted in the display region of the third display section 26. Specifically, the occupant views the scene ahead of the vehicle 12 through the third display section 26 (windshield glass 18), and so the CPU 30 references the map data for the destination point to determine whether or not the destination point is visible through the windshield glass 18. In a case in which the CPU 30 determines that the destination point is not visible, processing transitions to step S105. In a case in which the CPU 30 determines that the destination point is visible, processing transitions to step S106.

At step S105, the CPU 30 displays the first image 70 indicating the orientation of the destination point on the third display section 26. For example, if the destination point G2 in FIG. 5 is set as the destination point of the vehicle 12, this destination point G2 is blocked from view by the buildings B1 to B3 in the surroundings and is not visible from the vehicle 12. Thus, the CPU 30 generates and displays the first image 70 indicating the orientation of the destination point G2. Since the destination point G2 is positioned at an orientation toward the oblique front-left of the vehicle 12, the orientation icon 70B is displayed so as to point toward the oblique front-left similarly to the first image 70 illustrated in FIG. 6.

At step S106, the CPU 30 displays the second image 80 at a position corresponding to the destination point that is visible through the third display section 26. Namely, the distance L from the vehicle 12 to the destination point is less than 200 m, and so the CPU 30 indicates the position of the destination point that is visible across the third display section 26 using the second image 80.

Figure 8A:
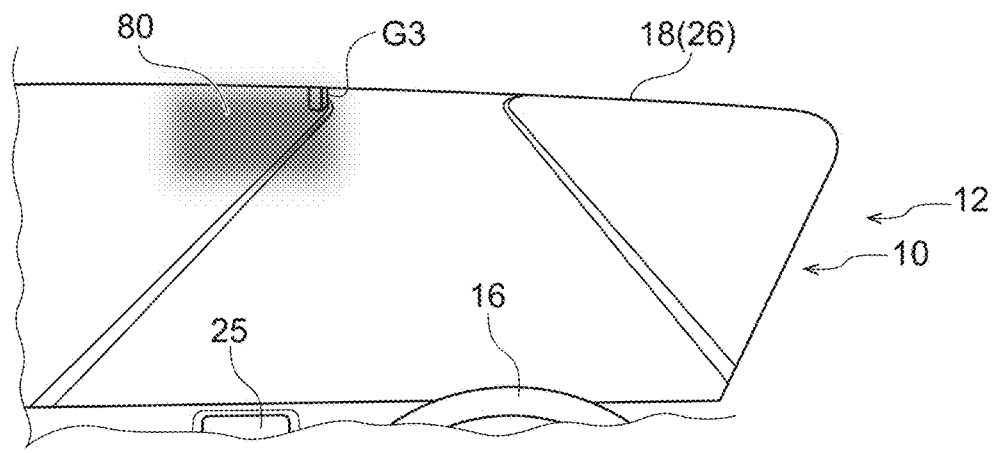
FIG. 8A is a diagram illustrating an example of a display method of a second image that is altered as a distance from a vehicle to a destination point decreases in a case in which the distance from the vehicle to the destination point is less than the distance L1 and no less than a distance L2.

As illustrated in FIG. 8A to FIG. 8C and FIG. 9A to FIG. 9C, in a case in which the occupant is viewing the scene ahead through the third display section 26 (windshield glass 18), the second image 80 is displayed so as to be superimposed on the actual destination point being viewed by the occupant. As illustrated in FIG. 8A, in a case in which the distance L from the vehicle 12 to the destination point is a distance L2 (=100 m) or greater, the second image 80 is displayed in the form of a flat rectangular shape that is out of focus. Note that an "out of focus" form refers to a state in which the outline of the image is faint and blurred. There is no limitation to projecting an out-of-focus image on the third display section 26, and any image with a blurred outline may be generated and displayed. As illustrated in FIG. 8A, the second image 80 in a state with a blurred outline is displayed on the third display section 26 so as to be superimposed on the destination point G3 present ahead of the vehicle 12. In this state, the second image 80 serves as a display that indicates to the occupant the region where the destination point G3 is present.

At step S107, the CPU 30 determines whether or not the distance L to the destination point is less than the distance L2 based on the position information for the vehicle 12 and for the destination point. Note that as an example, the distance L2 is set to 100 m. Thus, the CPU 30 determines at step S107 whether or not the distance L from the vehicle 12 to the destination point is less than 100 m. In a case in which the distance L to the destination point is 100 m or greater, the CPU 30 transitions to the processing of step S108. In a case in which the distance L to the destination point is less than 100 m, the CPU 30 transitions to the processing of step S109. Note that the distance L2 corresponds to a "second threshold value" of the present disclosure.

At step S108, the CPU 30 displays the second image 80 so as to gradually become smaller in size as the distance L from the vehicle 12 to the destination point decreases. As an example, this may be realized by altering the image such that the second image 80 gradually comes into focus as the distance L from the vehicle 12 to the destination point decreases.

Namely, when the second image 80 has been set out of focus to a state in which its outline is almost unintelligible, the surface area of the display region occupied by the second image 80 increases and the transparency of the second image 80 increases concurrently. In this state, the second image is displayed so as to be superimposed on a region of a certain size in the scene ahead as viewed by the occupant. Since the image is highly transparent, the occupant's visibility of the scene ahead is not impaired. As the second image 80 gradually comes into focus and the outline of the second image 80 becomes clearer, the surface area of the display region occupied by the second image 80 decreases. When this occurs, the transparency of the second image 80 is gradually reduced, and so the presence of the second image 80 can be recognized as an image indicating a specific point in the scene ahead.

Figure 8B:
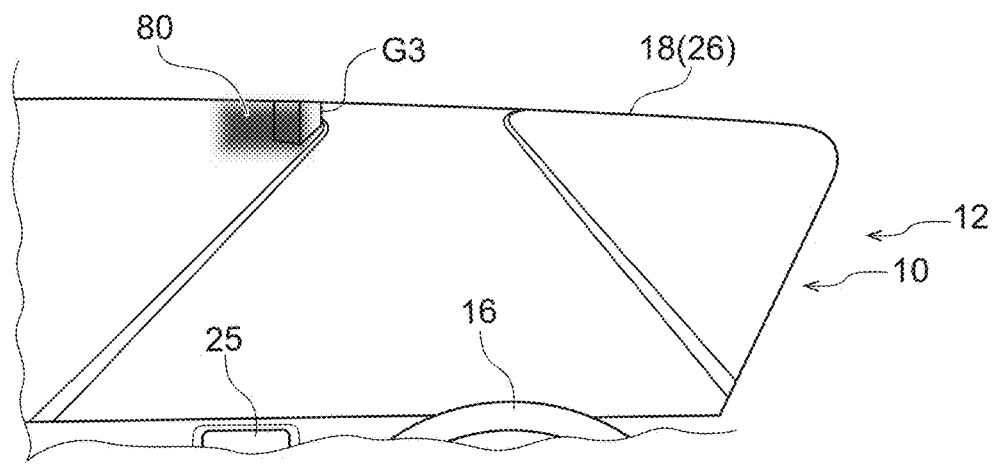
FIG. 8B is a diagram illustrating an example of a display method of a second image that is altered as a distance from a vehicle to a destination point decreases in a case in which the distance from the vehicle to the destination point is less than the distance L1 and no less than the distance L2.
Figure 8C:
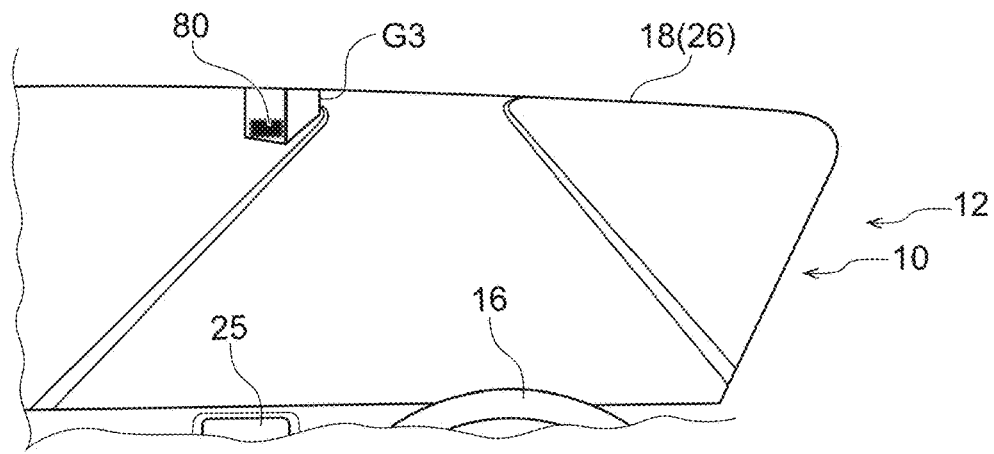
FIG. 8C is a diagram illustrating an example of a display method of a second image that is altered as a distance from a vehicle to a destination point decreases in a case in which the distance from the vehicle to the destination point is less than the distance L1 and no less than the distance L2.

As an example, FIG. 8A to FIG. 8C illustrate alterations to the second image 80 in a case in which the vehicle 12 is gradually approaching such that the distance L to the destination point G3 gradually decreases from a position at less than 200 m to a position at 100 m. As illustrated in FIG. 8A, at a position where the distance L from the vehicle 12 to the destination point G3 is closer than 200 m, the destination point G3 is an extremely small presence in the scene ahead, and can barely be seen. However, since the second image is displayed on the third display section 26 so as to be superimposed on the destination point G3, the occupant understands that the destination point G3 is present in a region at the front-left of the lane of travel. As illustrated in FIG. 8B to FIG. 8C, as the vehicle 12 approaches the destination point G3, the outline and color of the second image 80 that was faintly displayed gradually becomes clearer, and is altered to a form in which the position of the destination point G3 is clearly indicated.

After the processing of step S108 has ended, the CPU 30 repeats the processing of step S107.

At step S109, the CPU 30 displays the second image 80 so as to gradually become larger in size as the distance L from the vehicle 12 to the destination point decreases. When this is performed, the second image 80 is displayed as a clear image representing a flag.

Figure 9A:
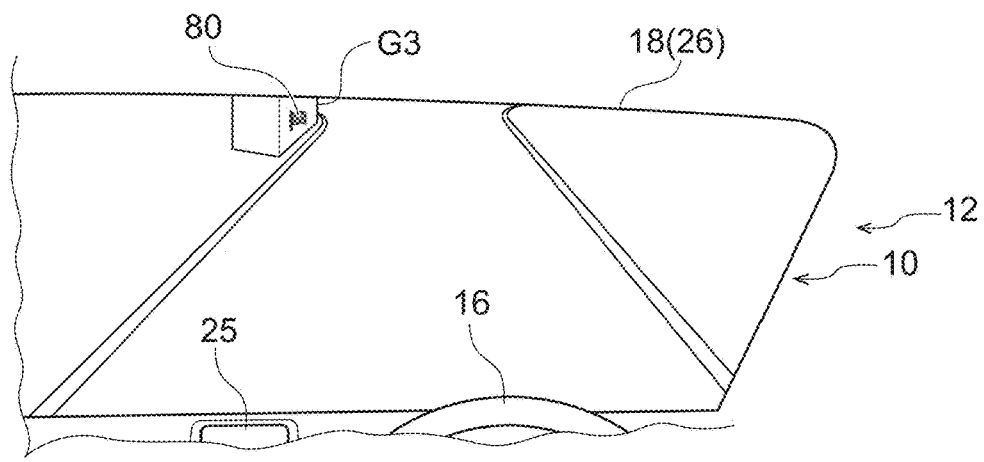
FIG. 9A is a diagram illustrating an example of a display method of a second image that is altered as a distance between a vehicle and a destination point decreases in a case in which the distance from the vehicle to the destination point is less than the distance L2.
Figure 9B:
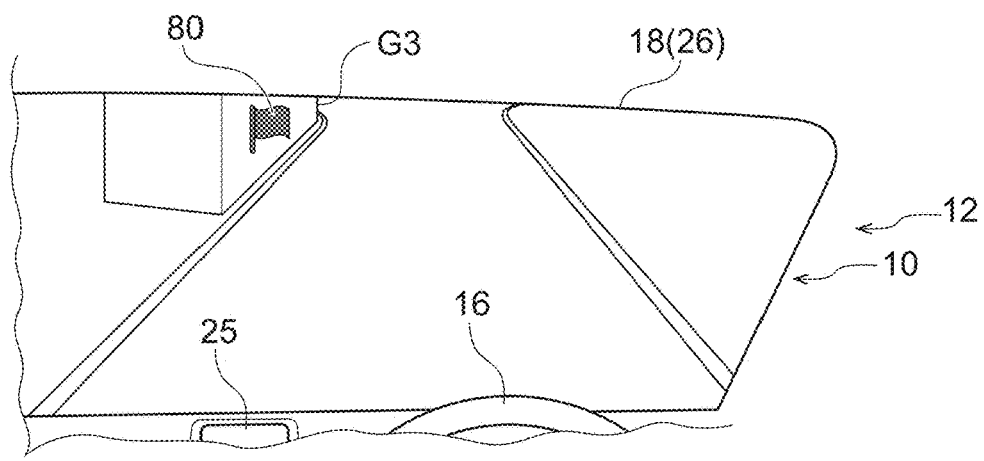
FIG. 9B is a diagram illustrating an example of a display method of a second image that is altered as a distance between a vehicle and a destination point decreases in a case in which the distance between a vehicle and a destination point is less than the distance L2.
Figure 9C:
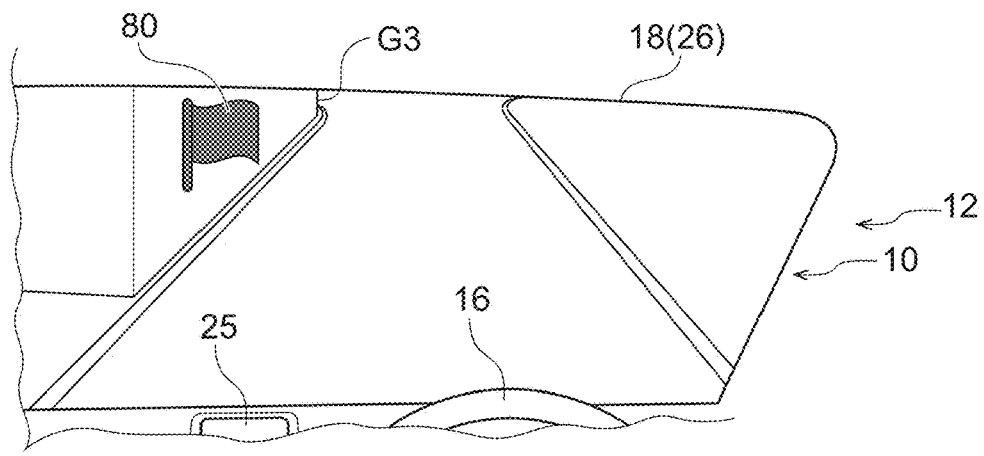
FIG. 9C is a diagram illustrating an example of a display method of a second image that is altered as a distance between a vehicle and a destination point decreases in a case in which the distance from the vehicle to the destination point is less than the distance L2.

Namely, as illustrated in FIG. 9A to FIG. 9C, when the distance L from the vehicle 12 to the destination point G3 is less than 100 m, the vicinity of the destination point G3 can be clearly seen across the third display section 26. Thus, enlarging the second image 80 as the destination point G3 gradually draws nearer in the display region of the third display section 26 enables a visual effect in which the second image 80 draws nearer the vehicle 12 as an integral unit with the destination point G3 to be imparted to the occupant.

After the processing of step S109 has ended, the CPU 30 transitions to the processing of step S110. At step S110, the CPU 30 determines whether or not the vehicle 12 has reached the destination point. In a case in which a determination is made that the destination point has been reached based on the position information for the vehicle, the CPU 30 deletes the second image from the display region of the third display section 26 and ends the display processing. On the other hand, in a case in which a determination is made that the destination point has not yet been reached, the CPU 30 repeats the processing of step S109.

As described above, the vehicle display device 10 according to the present exemplary embodiment displays a predetermined image in the display region of the third display section 26 depicting the scene ahead of the vehicle 12. The vehicle display device 10 acquires the position information for the vehicle 12 and the position information for the destination point, and determines whether or not the relationship between the position of the vehicle 12 and the position of the destination point satisfies the predetermined condition relating to visibility. The first image 70 indicating the orientation of the destination point is displayed in the display region in a case in which a determination is made that the predetermined condition is satisfied. This enables the orientation of the destination point to be conveyed to the occupant in consideration of the relationship between the position of the vehicle 12 and the position of the destination point.

Specifically, the first image 70 indicating the orientation of the destination point is displayed in the display region in a case in which the distance L from the vehicle 12 to the destination point is the distance L1 (=200 m) or greater. Thus, the orientation of the destination point is displayed on the third display section 26 in for example cases in which the distance from the vehicle to the destination point is far enough that it would be difficult to see the destination point through the third display section 26.

Moreover, in the present exemplary embodiment, the first image 70 indicating the orientation of the destination point is displayed in the display region in a case in which the position of the destination point is a position that is not included in the scene ahead in the display region. Thus, the orientation of the destination point is displayed on the third display section 26 in for example cases in which buildings in the surrounding area block the view and the destination point is not visible through the display region.

Thus, in the vehicle display device 10 according to the present exemplary embodiment, the first image 70 is displayed when it is envisaged that it would be difficult to see the destination point in the display region of the third display section 26, and so the destination point included in the scene ahead of the vehicle 12 and the first image 70 do not coexist in the display region, such that the destination point-related information can be displayed without annoying the occupant.

On the other hand, in the present exemplary embodiment, the second image 80 indicating the destination point is displayed at a position corresponding to the destination point in the scene ahead of the vehicle 12 in a case in which the positional relationship between the vehicle 12 and the destination point does not satisfy the predetermined condition. This enables the position of the destination point to be conveyed to the occupant in consideration of the positional relationship between the vehicle and the destination point.

Specifically, the second image 80 is displayed in a case in which the distance L from the vehicle 12 to the destination point is less than the distance L1 (=200 m) and the destination point is visible across the third display section 26.

When this is performed, as illustrated in FIG. 8A, the second image 80 is displayed in a form in which the image is out of focus in a case in which the distance L from the vehicle 12 to the destination point is the distance L2 (=100 m) or greater. Namely, the second image 80 is displayed with a blurred outline at a position where the destination point is an extremely small presence in the scene ahead, thereby indicating the region where the destination point is present to the occupant. This enables the occupant to perceive the region where the destination point is present in the scene ahead of the vehicle at an early stage, enabling the occupant to prepare for arrival at the destination point.

Moreover, as illustrated in FIG. 8B to FIG. 8C, the second image 80 is altered from its out-of-focus state so as to gradually come into focus as the distance L from the vehicle 12 to the destination point decreases. Thus, the outline of the second image 80 gradually becomes clearer and is altered to a form in which the position of the destination point is clearly indicated as the vehicle approaches the destination point. Displaying the second image in a form in which the destination point gradually becomes clearer and more recognizable from a position before the destination point in this manner enables the occupant to perceive the degree of progress toward the destination point without feeling any annoyance.

Furthermore, at the same time as the second image 80 is altered so as to gradually come into focus, the second image 80 is displayed so as to gradually become smaller as the distance L from the vehicle 12 to the destination point decreases. Namely, the destination point is an extremely small presence in the scene ahead in a case in which the distance L from the vehicle 12 to the destination point is comparatively far, and so intentionally enlarging the display of the second image 80 enables the occupant to perceive the region where the destination point is present while keeping their attention on the scene ahead. By then gradually making the second image 80 smaller as the vehicle 12 approaches the destination point, the form of display is altered such that the region where the destination point is present is reduced in size, such the occupant naturally shifts their attention toward the destination point in the scene ahead. In this manner, the occupant's perception of the destination point can be made to naturally shift from the second image to the destination point in the scene ahead as the vehicle 12 approaches the destination point.

Moreover, in the present exemplary embodiment, in a case in which the distance from the vehicle 12 to the destination point is less than the distance L2 (=100 m), the second image 80 is displayed so as to gradually become larger as the distance from the vehicle to the destination point decreases. Namely, at a distance where the destination point is visible through the third display section 26, the display of the second image 80 is enlarged as the destination point gradually draws nearer. This enables a visual effect in which the second image 80 draws nearer the vehicle 12 as an integral unit with the destination point to be imparted to the occupant. This enables the occupant to intuitively perceive the degree of progress toward the destination point.

Moreover, in the present exemplary embodiment, the display region of the third display section 26 is configured by the projection surface provided at the vehicle front side of the driving seat and projected onto by the head-up display device 44. The second image 80 indicating the destination point of the vehicle is displayed at a position corresponding to the destination point in the scene ahead of the vehicle as viewed through the display region. Thus, the vehicle display device 10 displays the second image 80 so as to be superimposed on the scene ahead as viewed from the driving seat, thereby enabling the driving seat occupant to perceive the destination point without having to greatly shift their gaze.

Additional Explanation

Figure 10:
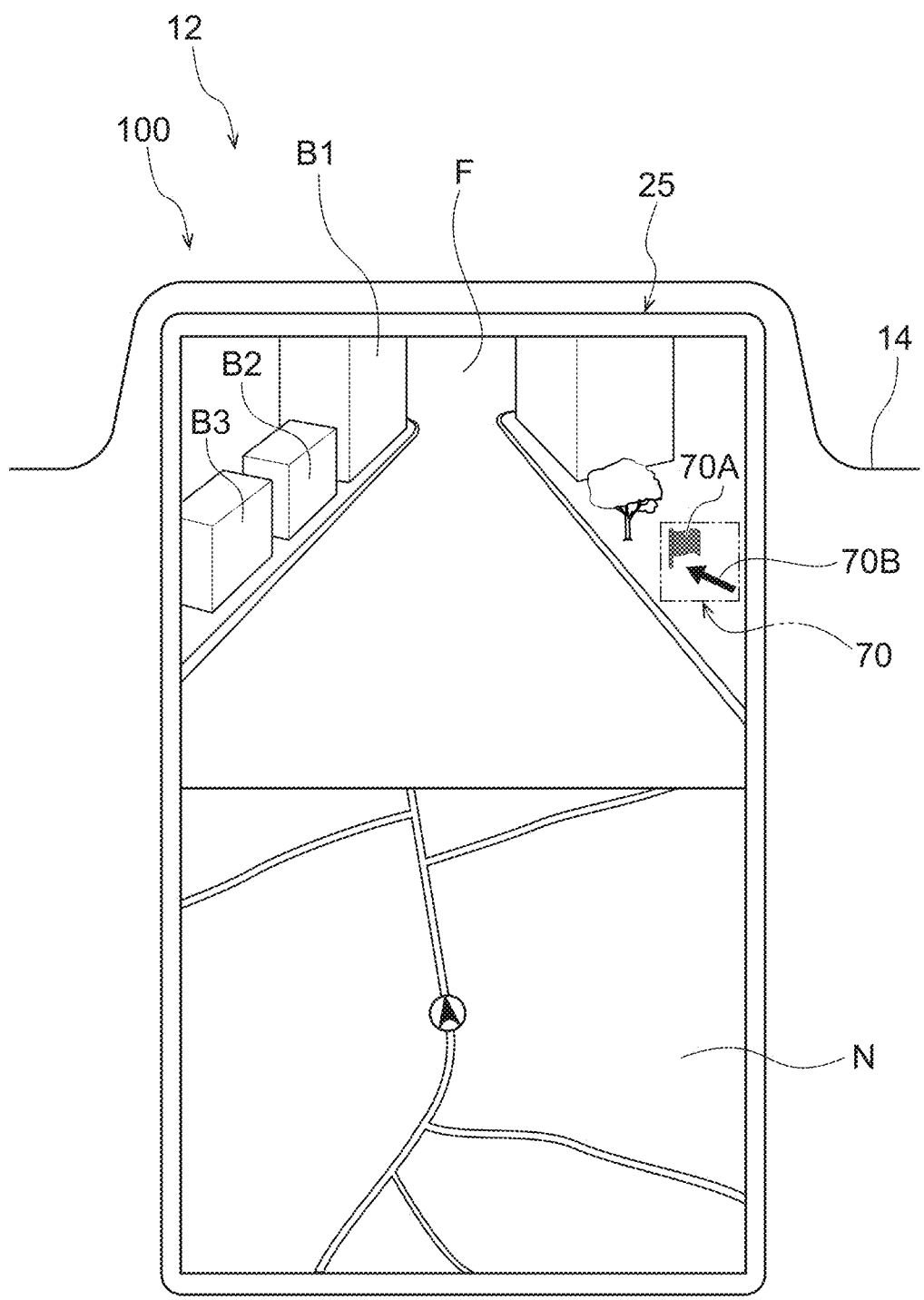
FIG. 10 is a schematic diagram illustrating a vehicle display device according to a modified example of an exemplary embodiment.

Although a case in which the display region depicting the scene ahead of the vehicle is configured by the projection surface of the head-up display device 44 has been described in the above exemplary embodiment, the present disclosure is not limited thereto. As illustrated by a vehicle display device 100 according to a modified example in FIG. 10, the first image 70 or second image 80 may be displayed in the display region of the second display section 25 configured by the display provided to the instrument panel 14. In the second display section 25 in FIG. 10, a map image N depicting the current position of the vehicle 12 is displayed in a lower part of the display region, and a frontal image F depicting the scene ahead of the vehicle is displayed in an upper part of the display region. The frontal image F is for example configured by an image or an animated frontal image acquired from a non-illustrated camera that images ahead of the vehicle 12. Such a configuration enables an occupant viewing the second display section 25 to perceive information relating to the destination point of the vehicle 12, regardless of the seating position of the occupant inside the vehicle cabin.

Similarly, the first image 70 or second image 80 may be displayed in the display region of the first display section 24 configured by the meter display provided to the instrument panel 14 at the vehicle front side of the driving seat. Since the first display section 24 is provided at the vehicle front side of the driving seat, the driving seat occupant is able to view the first display section 24 and to perceive information relating to the destination point of the vehicle 12 almost without having to shift their gaze from the scene ahead of the vehicle.

The forms of display of the first image 70 and the second image 80 described in the above exemplary embodiment are merely examples, and may be modified as appropriate within a range not departing from the spirit of the present disclosure.

Moreover, although the first image 70 or second image 80 is displayed in the display region of the third display section 26 when the vehicle is traveling by autonomous driving in the display processing of the above exemplary embodiment, there is no limitation thereto. For example, configuration may be such that the first image 70 or second image 80 is displayed in the display region of the third display section 26 when traveling by manual driving to a set destination point.

Moreover, in the above exemplary embodiment, the "predetermined condition relating to visibility" for determining whether or not the first image is to be displayed in the display region may be a determination as to whether or not the occupant cannot see the destination point through the display region based on surroundings information relating to the environment in the vicinity of the vehicle. Namely, a determination may be made that the occupant cannot see the destination through the display region in a case in which surrounding environment of the current position of the vehicle is experiencing bad weather such as thick fog or strong wind and rain, and in cases of travel along poorly lit roads at night, and so the first image 70 is displayed in the display region.

Note that in the above exemplary embodiment, if an issue that the invention is attempting to resolve is taken to be "to provide a vehicle display device, a display method, and a program that enable an occupant to perceive the presence of a destination point at an early stage without feeling any annoyance", this issue can be resolved by the configuration of "a vehicle display device configured to display a predetermined image on a display region depicting a scene ahead of a vehicle, including a position information acquisition section configured to acquire position information for the vehicle and position information for a destination point, and a display section configured to display an image (second image) indicating the destination point at a position corresponding to the destination point in the scene ahead of the vehicle depicted in the display region. The display section is configured to display the image in an out-of-focus state in a case in which a distance from the vehicle to the destination point is a predetermined threshold (distance L2) or greater".

Namely, in a case in which the distance from the vehicle to the destination point is a predetermined threshold or greater and the destination point is an extremely small presence in the scene ahead of the vehicle, it would be difficult to intuitively perceive information relating to the distance from the vehicle to the destination point when displayed as text or the like. However, in the above configuration, in a case in which the distance from the vehicle to the destination point is the predetermined threshold or greater, the second image is displayed in an out-of-focus state. Thus, the region where the destination point is present is indicated by superimposing the second image in a form with a blurred outline on the display region at a position corresponding to the destination point. This enables the occupant to perceive the region where the destination point is present while focusing their attention on the scene ahead of the vehicle, thereby enabling the occupant to perceive the presence of the destination point at an early stage without feeling any annoyance.

Note that in a case in which only the processing of the invention with the above configuration is being implemented during the display processing of the above exemplary embodiment, steps S102 to S105 may be omitted from the display processing described in the flowchart in FIG. 4.

Note that the display processing executed by the CPU reading and executing software (a program) in the above exemplary embodiment may be executed by various types of processor other than the CPU. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The display processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although a format has been described in which the display processing and the display program is pre-stored (installed) in the ROM or the storage in the above exemplary embodiment, there is no limitation thereto. The program may be provided in a format recorded onto a recording medium such as compact disc read only memory (CD-ROM), digital versatile disc read only memory (DVD-ROM), or universal serial bus (USB) memory. Alternatively, the program may be provided in format downloadable from an external device over a network.

What is claimed is:

1. A display method for displaying a predetermined image at a display region disposed at a windshield glass of the vehicle and depicting a scene ahead of a vehicle, the display method comprising, via a computer:

acquiring position information for the vehicle and position information for a destination point;

determining whether an actual destination point is visible through the windshield glass by an occupant of the vehicle by detecting that a distance from the vehicle to the destination point is less than a first threshold value, based on the position information for the vehicle and the position information for the destination point, displaying a second image indicating a region where the actual destination point is present, superimposing, in an out-of-focus state, at least a part of the second image on the actual destination point, when determining that the actual destination point is visible through the windshield glass by the occupant, when the distance from the vehicle to the destination point is less than the first threshold value and is no less than a second threshold value that is lower than the first threshold value, displaying the second image in the display region such that the second image becomes smaller in size as the distance from the vehicle to the destination point decreases over time, when the distance from the vehicle to the destination point is less than the second threshold value, displaying the second image in the display region such that the second image becomes larger in size as the distance from the vehicle to the destination point decreases over time, and displaying a first image indicating an orientation of the destination point at one end of the display region when determining that the actual destination point is determined not to be visible through the windshield glass by the occupant.

2. A computer readable non-transitory storage medium storing a program for displaying a predetermined image at a display region disposed at a windshield glass of the vehicle and depicting a scene ahead of a vehicle, the program being executable by a computer to perform processing, the processing comprising:

determining whether an actual destination point is visible through the windshield glass by an occupant of the vehicle by detecting that a distance from the vehicle to the destination point is less than a first threshold value, based on the position information for the vehicle and the position information for the destination point, displaying a second image indicating a region where the actual destination point is present, superimposing, in an out-of-focus state, at least a part of the second image on the actual destination point, when determining that the actual destination point is visible through the windshield glass by the occupant, when the distance from the vehicle to the destination point is less than the first threshold value and is no less than a second threshold value that is lower than the first threshold value, displaying the second image in the display region such that the second image becomes smaller in size as the distance from the vehicle to the destination point decreases over time, when the distance from the vehicle to the destination point is less than the second threshold value, displaying the second image in the display region such that the second image becomes larger in size as the distance from the vehicle to the destination point decreases over time, and displaying a first image indicating an orientation of the destination point at one end of the display region when determining that the actual destination point is determined not to be visible through the windshield glass by the occupant the display region depicting the scene ahead of the vehicle; and.

3. A vehicle display device configured to display a predetermined image at a display region disposed at a windshield glass of the vehicle and depicting a scene ahead of a vehicle, the vehicle display device comprising:

a memory; and a processor coupled to the memory, the processor being configured to:

acquire position information for the vehicle and position information for a destination point, determine whether an actual destination point is visible through the windshield glass by an occupant of the vehicle by detecting that a distance from the vehicle to the destination point is less than a first threshold value, based on the position information for the vehicle and the position information for the destination point, display a second image indicating a region where the actual destination point is present, superimposing, in an out-of-focus state, at least a part of the second image on the actual destination point, when determining that the actual destination point is visible through the windshield glass by the occupant, when the distance from the vehicle to the destination point is less than the first threshold value and is no less than a second threshold value that is lower than the first threshold value, the processor is configured to display the second image in the display region such that the second image becomes smaller in size as the distance from the vehicle to the destination point decreases over time, when the distance from the vehicle to the destination point is less than the second threshold value, the processor is configured to display the second image in the display region such that the second image becomes larger in size as the distance from the vehicle to the destination point decreases over time, and display a first image indicating an orientation of the destination point at one end of the display region when determining that the actual destination point is not visible through the windshield glass by the occupant.

4. The vehicle display device of claim 3, the processor being configured to:

when determining, detect whether a distance from the vehicle to the destination point is equal to or greater than a first threshold value; and when detecting that the distance from the vehicle to the destination point is equal to or greater than the first threshold value, not determine that the destination point is not displayed at the display region.

5. The vehicle display device of claim 4, the processor being configured to:

when determining detect whether a position of the destination point is a position that is not displayed at the display region because it is blocked by surrounding objects; and when detecting that the position of the destination point is a position that is not displayed at the display region because it is blocked by surrounding objects, determine that the destination point is not displayed at the display region even if the distance from the vehicle to the destination point were less than the first threshold value.

6. The vehicle display device of claim 4, wherein, when the distance from the vehicle to the destination point is less than the first threshold value and is not less than a second threshold value that is lower than the first threshold value, the processor is configured to display the second image in the display region such that the second image becomes smaller in size as the distance from the vehicle to the destination point decreases.

7. The vehicle display device of claim 6, wherein, when the distance from the vehicle to the destination point is less than the second threshold value, the processor is configured to display the second image in the display region such that the second image becomes larger in size as the distance from the vehicle to the destination point decreases.

8. The vehicle display device of claim 3, wherein the processor is configured to display the second image in the display region such that the second image comes into focus from an out-of-focus state as a distance from the vehicle to the destination point decreases.

9. The vehicle display device of claim 3, wherein:
the display region is configured by a projection surface provided at a vehicle front side of a driving seat and configured to be projected onto by a head-up display device; and
the processor is configured to display the second image at a position corresponding to the destination point in the scene ahead of the vehicle as seen through the display region.

* * * * *